United States Patent Office 3,557,086
Patented Jan. 19, 1971

3,557,086
PROCESS FOR PREPARING SUBSTITUTED
HEXAHYDRO-1,4-DIAZEPINES
Giuseppe Cantatore and Alberto Bonvicini, Terni, Italy, assignors to Montecatini Edison S.pA., Milan, Italy
No Drawing. Filed Nov. 3, 1966, Ser. No. 591,687
Claims priority, application Italy, Nov. 9, 1965, 24,848/65
Int. Cl. C07d 53/02
U.S. Cl. 260—239    10 Claims

ABSTRACT OF THE DISCLOSURE

Alkyl substituted hexahydro-1,4-diazepines having the formula

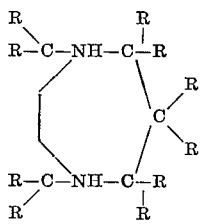

wherein the R substituents are the same or different and are selected from the group consisting of hydrogen atoms and alkyl groups containing 1 to 18 carbon atoms are prepared by reacting an ethylene-diamine with an aliphatic alpha-beta unsaturated aldehyde or ketone and then catalytically hydrogenating the reaction mixture. Novel alkyl substituted hexahydro-1,4-diazepines are disclosed.

The present invention relates to the preparation of substituted hexahydro-1,4-diazepines (1,4-diazacycloheptanes or homopiperazines) of the general formula:

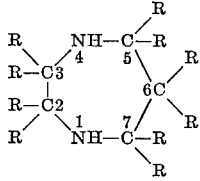

wherein the R radicals may be the same or different and are selected from the group consisting of a hydrogen atom and alkyl radicals, which alkyl groups preferably contain from about 1 to 18 carbon atoms. Examples of alkyl radicals, which may be linear or branched, are methyl, ethyl, isopropyl, n-propyl, n-amyl, tert.butyl, n-dodecyl, n-octadecyl, etc.

Various derivatives of hexahydro-1,4-diazepines show a certain physiological activity (F. Poppelsdorf, R. C. Myerly, J. Org. Chem. 26, 131 (1961); A. H. Sommers et al., J. Am. Chem. Soc. 76, 5805 (1954)).

The synthesis of substituted hexahydro-1,4-diazepines has been accomplished by various methods, including the reductive cyclization of cyanoethyl derivatives of ethylenediamine, the reaction of dihalogen derivatives with di-arylsulfonylethylenediamines and others. Some particular substituted hexahydro-1,4-diazepines having aromatic substituents, corresponding to the general formula:

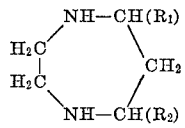

wherein $R_1$ is an alkyl or an aryl radical and $R_2$ is an aryl radical, optionally hydroxylated, have been prepared according to German Pat. No. 1,047,785, by reaction of ethylenediamine with benzalacetophenone, benzalacetone and the like, followed by hydrogenation.

By hydrogenating some substituted tetrahydro-1,4-diazepines, J. Spragne (P.B. 135.342, Dep. of the Army Project No. 593.32–006, Jan. 31, 1958) has prepared the corresponding substituted hexahydro-1,4-diazepines.

In general, the preparations of substituted hexahydro-1,4-diazepines reported in the literature are characterized by very low yields. Thus, Poppelsdorf obtains 2-methyl-hexahydro-1,4-diazepine with a yield of 8.3% and 6-methylhexahydro-1,4-diazepine with a yield of 20.6%. Moreover the syntheses known heretofore are complex and expensive (see Poppelsdorf, ref.).

In accordance with the present invention it is now possible to prepare alkylsubstituted hexahydro-1,4-diazepines by a process which is easy to perform, at a low cost, and which provides the final products in good yields.

The process of the present invention comprises subjecting to catalytic hydrogenation the reaction mixture obtained by reacting ethylenediamines having the general formula:

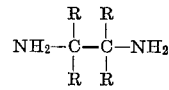

(wherein R is as defined above) and aliphatic $\alpha,\beta$-unsaturated carbonyl compounds of the general formula:

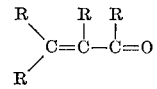

(wherein R is as defined above).

The reaction is preferably carried out in an alcoholic solvent, such as methyl or ethyl alcohol and the like, but can also be carried out in other solvents such as ethers and hydrocarbons.

The two reactants, namely the diamine and the $\alpha,\beta$-unsaturated aliphatic carbonyl compound, are generally used in equimolar ratios; an excess up to about 20% by weight of one or of the other reactant (preferably the carbonyl compound) can, however, be used.

The preliminary reaction between diamine and unsaturated aliphatic carbonyl compound is preferably carried out at a temperature between about −10 and +80° C., more preferably −10° and 30° C. but can also be carried out at higher temperatures. The preliminary reaction is preferably carried out for times varying from about 5 minutes to 20 hours, preferably 30 minutes to 20 hours.

The hydrogenation is preferably carried out directly on the mixture obtained from the preliminary reaction between diamine and $\alpha,\beta$-unsaturated aliphatic carbonyl compound.

Preferably, hydrogenation catalysts such as platinum, either in the form of $PtO_2$ Adams (Gilman, Organic Synthesis, vol. I, page 463—Ed. Wily and Sons, New York, 1948) or in the form of Pt supported on coal, or other known hydrogenation catalysts, such as palladium, nickel and the like are used. The hydrogenation is preferably carried out at temperatures between about 15° and 100° C. under a hydrogen pressure of about 2 to 150 atm. preferably 10–50 atm.

The aliphatic derivatives of the hexahydro-1,4-diazepines prepared by the process of the present invention can be used in the pharmaceutical field as intermediates for organic syntheses, for the preparation of tinctorial modifiers for synthetic fibers and for other similar uses.

Among the substituted hexahydro-1,4-diazepines prepared by the process of the present invention, the following are not known in the literature: 5,6,7-trimethyl-hexahydro-1,4-diazepine, 5,7-dimethyl-hexahydro - 1,4 - diazepine, 5,6 - dimethyl-7-propyl-hexahydro-1,4-diazepine, 2,5,5,7-tetramethyl-hexahydro - 1,4 - diazepine and 3,5,5,7-tetramethyl-hexahydro-1,4-diazepine.

The following examples further illustrate the invention without limiting the scope thereof.

EXAMPLE 1

196 g. (2 mols) of mesityl oxide were added, while agitating, to 123.6 g. (2 mols) of 97% ethylenediamine dissolved in 300 cc. of methanol and cooled to −10° C. The reaction mixture was kept for 10–15 hours at room temperature and the reaction mixture thus obtained was then subjected to hydrogenation in the presence of 0.4 g. of PtO$_2$-Adams under 15 atm. for 6 hours at room temperature.

After having removed the catalyst and the solvent by filtration and distillation, respectively, the residue was fractionated under reduced pressure.

233 g. of 5,5,7-trimethyl-hexahydro-1,4-diazepine, having the following characteristics were obtained:

boiling point, 67–68°/9 mm.,
boiling point, 190°/751 mm.,
$n_D^{20}$=1.4702,
percent nitrogen=19.62% (calculated for C$_8$H$_{18}$N$_2$, 19.69%),
the picrate is decomposed at 256–257° C.,
N,N′-dinitroso-derivative: M.P., 123–124° C.,
percent nitrogen=28.05% (calc. for
  C$_8$H$_{16}$O$_2$N$_4$=27.97%).

EXAMPLE 2

196 g. (2 mols) of 3-methyl-3-pentene-2-one were added, while agitating, to 123.6 g. (2 mols) of 97% ethylenediamine dissolved in 300 cc. of methanol and cooled to −10° C.

The reaction mixture was kept for 10–15 hours at room temperature and the reaction mixture thus obtained was then subjected to hydrogenation in the presence of 1 g. of PtO$_2$-Adams under 30 atm. for 4 hours at room temperature.

After having removed the catalyst and the solvent, the residue was fractionated under reduced pressure.

167 g. of 5,6,7-trimethyl-hexahydro-1,4-diazepine, having a boiling point of 86–93°/20 mm., were obtained.

After purification by further fractionation, the trimethylhexahydro-1,4-diazepine exhibited the following characteristics:

boiling point =82–83°/15 mm. (197–198°/750 mm.)
$n_D^{20}$=1.4774
percent nitrogen=19.61% (calc. for C$_8$H$_{18}$N$_2$=19.69%).

EXAMPLE 3

84 g. (1 mole) of methyl propenyl ketone were added, while agitating, to 61.8 g. (1 mole) of 97% ethylenediamine dissolved in 200 cc. of methanol and cooled to −10° C.

The reaction mixture was kept for 10–15 hours at room temperature and the reaction mixture thus obtained was then subjected to hydrogenation in the presence of 0.5 g. to PtO$_2$-Adams under 30 atm. for 6 hours at room temperature.

The catalyst and the solvent were removed and the residue was fractionated under atmospheric pressure, thus obtaining 103 g. of 5,7-dimethyl-hexahydro-1,4-diazepine having a boiling point of 182–186/752 mm.

After further fractionation, the purified dimethyl-hexahydro-1,4-diazepine exhibited the following characteristics:

boiling point=71–73°/16 mm. (183–184°/745 mm.)
$n_D^{20}$=1.4732
percent nitrogen=21.6% (calc. for C$_7$H$_{16}$N$_2$=21.8%)

EXAMPLE 4

126 g. (1 mole) of 3-methyl-3-heptene-2-one were added, while agitating, to 61.8 g. (1 mole) of 97% ethylenediamine dissolved in 200 cc. of methanol and cooled to −10° C.

The reaction mixture was kept for 15–20 hours at room temperature and then subjected to hydrogenation in the presence of 0.5 g. of PtO$_2$-Adams under 30 atm. for 6 hours at room temperature.

After having removed the catalyst and the solvent, the residue was fractionated under reduced pressure, thus obtaining 125 g. of 5,6-dimethyl-7-propyl-hexahydro-1,4-diazepine having a boiling point of 108–113°/17 mm.

After purification by fractionated re-distillation, the product exhibited the following characteristics:

boiling point=111–113°/17 mm.
$n_D^{20}$=1.4716
percent nitrogen=16.5% (calc. for C$_{10}$H$_{22}$N$_2$=16.47%)

EXAMPLE 5

196 g. (2 mols) of mesityl oxide were added, while agitating, to 148 g. (2 mols) of 1,2-propylenediamine dissolved in 300 cc. of methanol and cooled to −10° C.

The reaction mixture was kept for 5 hours at room temperature and then subjected to hydrogenation in the presence of 0.7 g. of PtO$_2$-Adams under 15 atm. for 6 hours at room temperature.

After having removed the catalyst and the solvent, the residue was fractionated under reduced pressure, thus obtaining 250 g. of 2 (or 3), 5,5,7-tetramethyl-tetrahydro-1,4-diazepine having the following characteristics:

boiling point=85–86°/22 mm.
$n_D^{20}$=1.4610
percent nitrogen=18.0% (calc. for C$_9$H$_{20}$N$_2$=17.92%)

Various changes and modifications can, of course, be made without departing from the spirit and scope of the present invention.

Having thus described our invention, what we desire to secure by Letters Patent and hereby claim is:

1. A process for the preparation of alkyl substituted hexahydro-1,4-diazepines having the formula

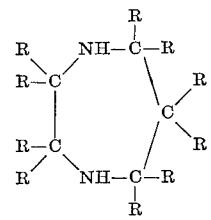

wherein the R substituents are the same or different and are selected from the group consisting of hydrogen atoms and alkyl radicals containing from 1 to 18 carbon atoms, said process comprising (1) reacting an ethylenediamine having the formula

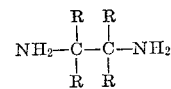

wherein R is as defined above with an α, β-unsaturated aliphatic carbonyl compound having the formula

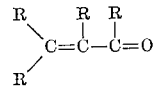

wherein R is as defined above and then (2) subjecting the reaction mixture directly, without separation of any product from step (1), to catalytic hydrogenation.

2. The process of claim 1 wherein said diamine is ethylenediamine or 1,2-propylenediamine.

3. The process of claim 1 wherein the α,β-unsaturated aliphatic carbonyl compound is mesityl oxide, 3-methyl-3-pentene-2-one, methyl-propenyl ketone or 3-methyl-3-heptene-2-one.

4. The process of claim 1 wherein said reaction (1) is carried out at a temperature between about −10° C. and 30° C.

5. The process of claim 1 wherein said reaction (1) is carried out at about room temperature.

6. The process of claim 1 wherein said hydrogenation reaction (2) is carried out at a temperature between about 15° C. and 100° C.

7. The process of claim 1 wherein said hydrogenation reaction (2) is carired out at about room temperature.

8. The process of claim 1 wherein said hydrogenation reaction (2) is carried out under a hydrogen pressure between about 10 and 50 atmospheres.

9. The process of claim 1 wherein said hydrogenation catalyst is selected from the group consisting of $PtO_2$ Adams, Pt supported on coal, palladium and nickel.

10. The process of claim 1 wherein said reaction catalyst is $PtO_2$ Adams.

References Cited

UNITED STATES PATENTS 3,040,029  6/1962  Poppelsdorf et al. ____ 260—239

FOREIGN PATENTS 1,047,785  12/1958  Germany _____ 260—239

OTHER REFERENCES

Mushkalo et al.: Chem. Abstracts, vol. 55, pp. 563–564 (1961).

ALTON D. ROLLINS, Primary Examiner